C. H. SHARP & P. S. MILLAR.
PHOTOMETER.
APPLICATION FILED DEC. 26, 1907.
960,420.
Patented June 7, 1910.
3 SHEETS—SHEET 1.
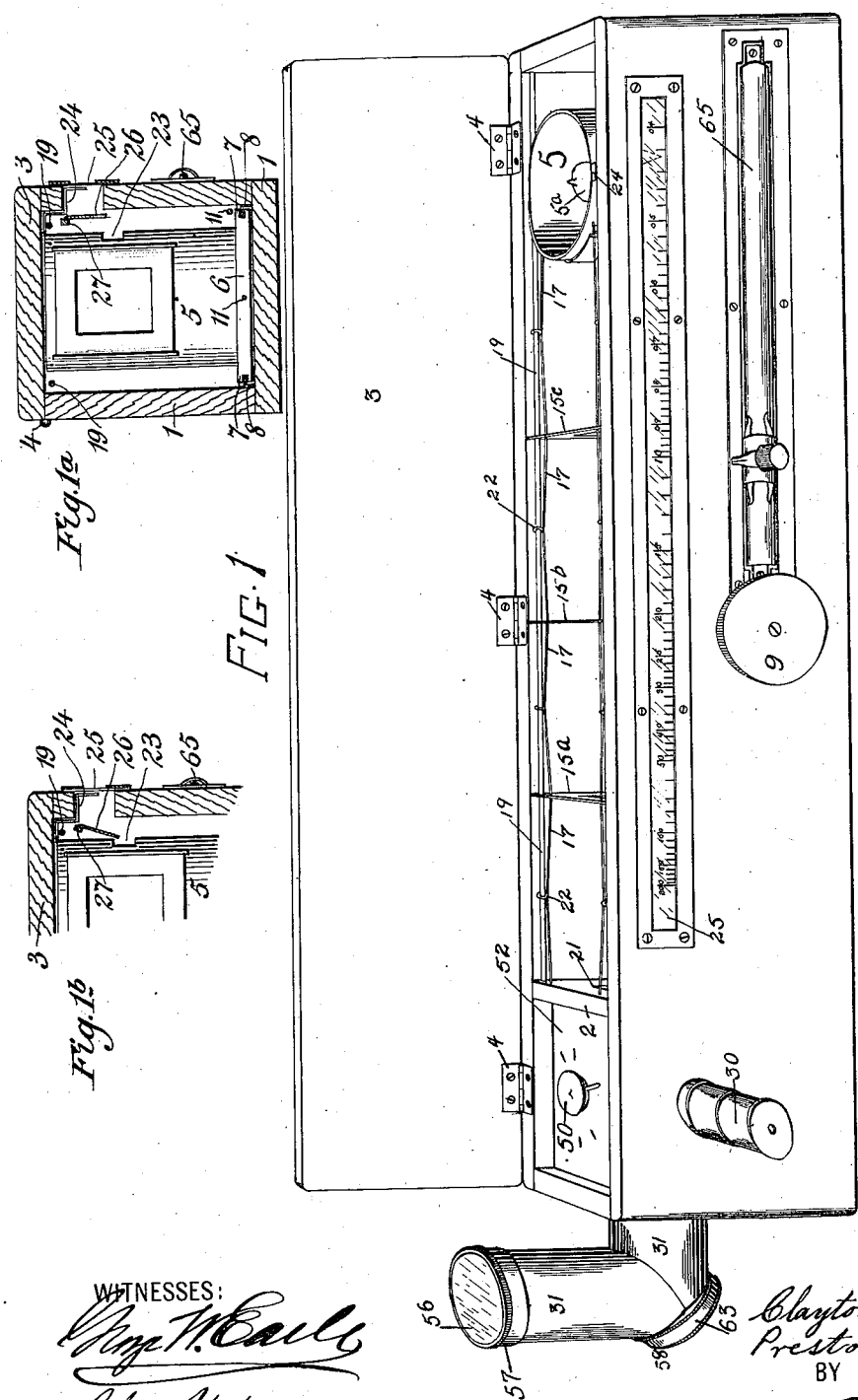
WITNESSES:
INVENTORS
Clayton H. Sharp
Preston S. Millar
BY
Edward P. Thompson
ATTORNEY C. H. SHARP & P. S. MILLAR.
PHOTOMETER.
APPLICATION FILED DEC. 26, 1907.
960,420.
Patented June 7, 1910.
3 SHEETS—SHEET 2.
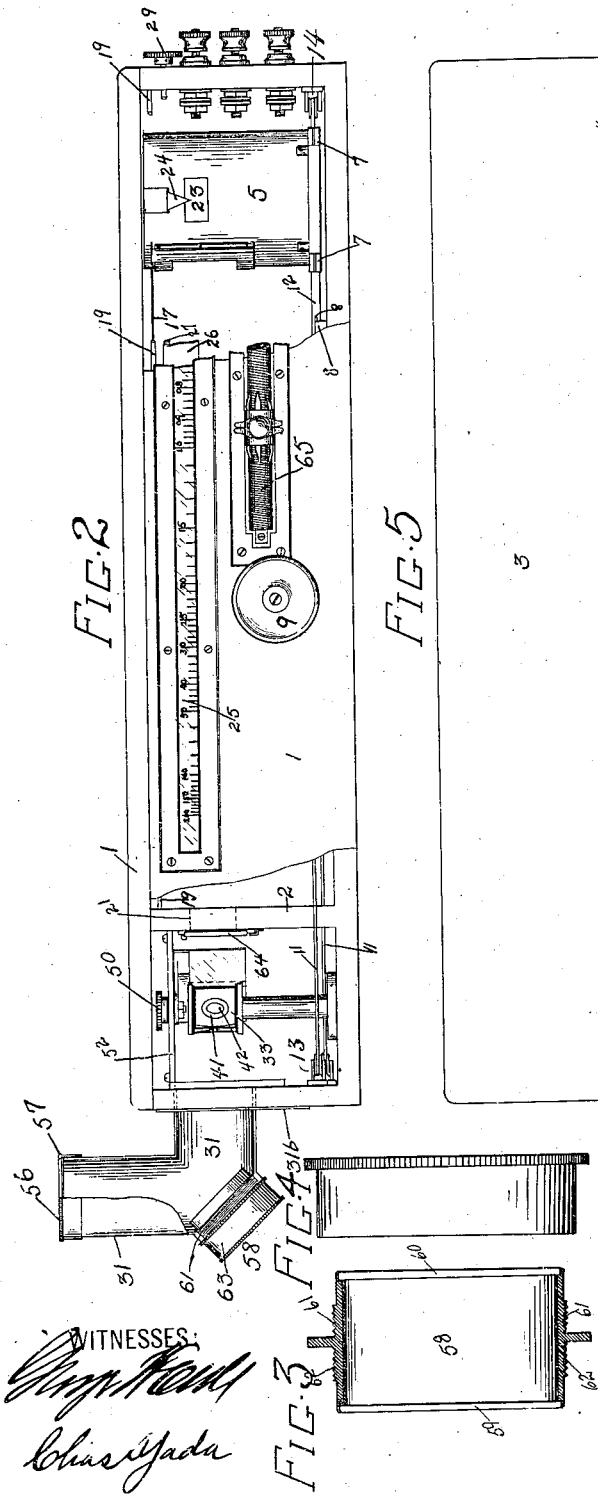
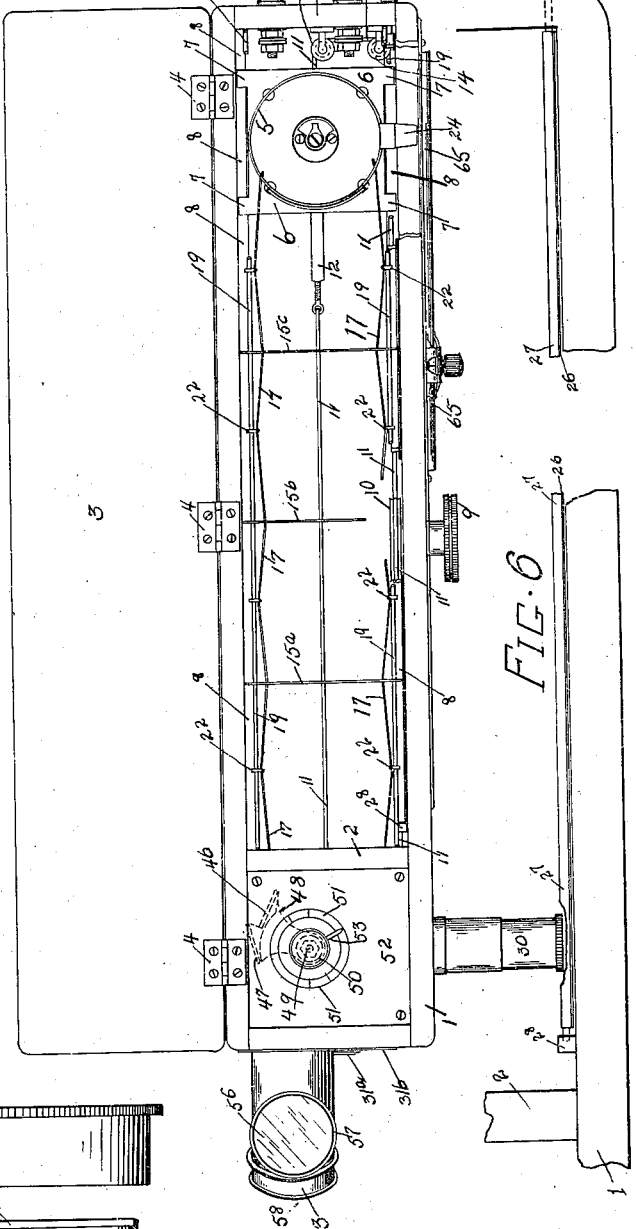
WITNESSES:
INVENTORS
Clayton H. Sharp
Preston S. Millar
BY
Edward P. Thompson
ATTORNEY C. H. SHARP & P. S. MILLAR.
PHOTOMETER.
APPLICATION FILED DEC. 26, 1907.
960,420.
Patented June 7, 1910.
3 SHEETS—SHEET 3.
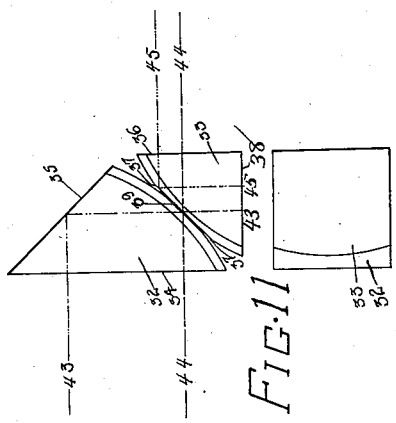
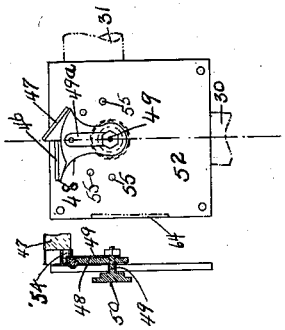
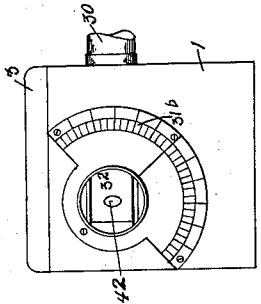
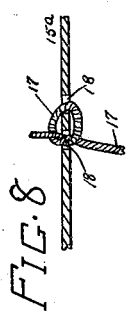
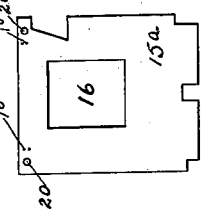
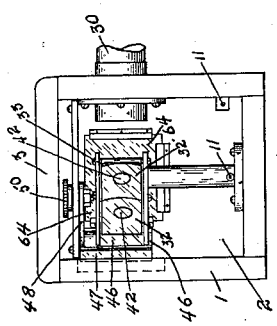
WITNESSES:
INVENTORS
Clayton H. Sharp
Preston S. Millar
BY
Edward P. Thompson
ATTORNEY

UNITED STATES PATENT OFFICE.

CLAYTON H. SHARP, OF WHITE PLAINS, AND PRESTON S. MILLAR, OF BROOKLYN, NEW YORK.

PHOTOMETER.

960,420.

Specification of Letters Patent.

Patented June 7, 1910.

Application filed December 26, 1907. Serial No. 408,070.

*To all whom it may concern:*

Be it known that we, CLAYTON H. SHARP and PRESTON S. MILLAR, citizens of the United States of America, and residents of, respectively, White Plains, in the county of Westchester and State of New York, and Brooklyn, in the county of Kings and State of New York, have invented certain new and useful Improvements in Photometers, of which the following is a specification.

Our invention, which relates to an apparatus for measuring candle-power and general illumination, has, for its aim, to provide an improved portable photometer, which is both simple and accurate in construction and operation; and which has a wide range or scope so that it may be used in any of the great variety of measurements and degrees of illumination that may be encountered in practice.

The objects of the invention are, further, to provide means for eliminating or minimizing the sources of error which too often exist in photometers; and to put on the market, an instrument which may be sold at a reasonable price.

Our photometer is so invented as to secure a sufficient degree of precision without complication of construction, without a prohibitive cost, and without involving delicate parts which would easily get out of order by rough handling.

Our portable photometer is applicable to a sufficiently precise measurement of the candle power of incandescent electric or other lamps, either in a dark or light room; to the determination of the intensity of the total illumination intensity produced at a given point by any number of sources of light, with the desired accuracy; to the measurement of the candle-power of street lamps, or of the general illumination produced thereby; and to the measurement of the intrinsic brightness of illuminated surfaces, such as walls, ceilings, etc.

The general nature of our conception comprises a simple arrangement of two prisms which constitute a photometric device, and which possesses maximum sensitiveness and accuracy; automatic adjusting screens, whereby the photometric device is protected from light reflected from the interior of the containing box; a translucent window with a shutter, permitting the scale to be illuminated by the lamp in the carriage, and read from the exterior of the box; and a translucent test plate which may be readily adjusted at any desired angle, and which may be used for measuring either candle-power or illumination intensity. When measuring candle-power, this plate is a diffusing test plate, protected from all but the direct rays of light from the light source tested, by the tube or box in which it is located. When measuring illumination intensity, the lower surface which is illuminated by transmitted light, is viewed through reflecting devices.

The invention also involves absorption screens which may be placed on either side of the photometric device, whereby the range of intensities measurable, is greatly increased.

We will now describe in detail what is exhibited in the drawings, without any regard to novel or old points.

Figure 1 is a perspective elevation of the general organization, with the lid of the box open. Fig. 1^A is a cross-section of Fig. 1, just to the left of the lamp carrier 5. Fig. 1^B is a similar, fragmentary view showing the shutter 26 open. Fig. 2 is a side elevation of the photometer, with portions of the sides broken away to exhibit some of the interior construction. Fig. 3 an enlarged sectional view of the reversible reflector seen also at the left hand end of Fig. 2. Fig. 4 is an opaque cap. Fig. 5 is a plan of the whole photometer, with the lid open, and with one or two details broken away. Dotted lines indicate some of the hidden parts. Fig. 6 is a plan of a portion of the case, to show especially, the shutter for the photometer. Fig. 7 is an elevation of one of the apertured opaque screens by itself. Fig. 8 shows, in section, a portion of such a screen to indicate the attachment of the propelling cord. The scale of the drawing is enlarged. Fig. 9 is a plan of the compartment containing the prisms, and some other elements not readily seen in the other figures. Fig. 10 is a plan diagram to indicate the nature of the device for forming concentric illuminated areas. Fig. 11 is a side view of the prisms. Fig. 12 is an end elevation of the photometer with the end of the box omitted. Fig. 13 is an end elevation of the photometer. Fig. 14 is an inverted plan of the reducing screens.

The containing box is represented by the numeral 1, while 2 indicates a partition for forming a compartment at one end.

3 indicates the cover, attached to the case by hinges 4.

The box may be used horizontal or at any angle desired.

5 is the movable comparison lamp carrier, for the lamp 5ª, having a base 6, with forked lugs 7, which are movable along guide rails 8, from about one end of the case, toward the partition 2, for the usual purpose of varying the distance of the source of the comparison light from the test plate. In order to propel the lamp carrier 5 from the outside of the box 1, there is provided a wheel handle 9 on the outside, connected to a pulley 10, on the inside of the case. One end of a cord 11 is attached to a forward end pole 12 of the carrier 5, then passes partly around pulleys at 13, then once around the pulley 10, then partly around pulleys 14 and then is fastened to the rear end of the carrier 5.

In conjunction with the above elements, is a plurality of apertured screens 15ª, 15ᵇ, 15ᶜ, of opaque material, one square aperture 16 being fully seen, in Fig. 7 of the drawings. When the carrier is propelled, it pushes, first the screen 15ᶜ, then it and the screen 15ᵇ, and then all three screens toward the partition 2. When the carrier 5 recedes, the cords 17, connecting the screens 15ª, 15ᵇ, 15ᶜ, together, and to the carrier 5, space the screens at intervals along the case.

18 represents holes through which the cords 17 pass for attachment to the screens. The screens 15ª, 15ᵇ, 15ᶜ ride on rods 19, which pass loosely through holes 20. The function of the apertured screens 15ª, 15ᵇ, and 15ᶜ is to cut off, from the final aperture 21, in the partition 2, all the light which is not absorbed by the black interior surfaces of the case 1 and 'lid' 3. Only the direct rays of light from the movable lamp, find their way to the aperture 21. The cords 17, are supported, not only by the screens 15ª, 15ᵇ, 15ᶜ, but also by rings 22 sliding on the rods 19. The left hand ends of the cords 17 are fastened to the partition 2. Obviously, the screens 15ª, 15ᵇ, 15ᶜ, should be black to act as light absorbers.

The carrier 5 is provided laterally with an aperture 23, and a pointer 24, opposite said aperture 23, and located between said aperture 23 and a slot in the side of the box 1, covered by a glass plate 25, which may have a graduated scale as indicated in Fig. 1, for indicating the luminosity of any object. Within the box 1 and along the slot, behind the scale, is a shutter 26, carried on a shaft 27, which have their bearings respectively in the right hand end 1ª, of the case 1, and the projecting bearing 28 on the inside of the case 1, near the partition 2, said shutter reaching the whole length of the translucent scale.

29 is a rotary handle for the shutter, on the outside of the box 1. When the shutter is opened a little, the scale on the glass 25 is illuminated by the movable lamp at that portion where the pointer 24 may happen to be. The shutter does not open very wide, but sufficiently to let enough light illumine the pointer 24.

Opposite the external light receiving tube 31, and located within the compartment, behind the partition 2, is a prism 32; and opposite the standard lamp and telescopic eye tube 30, is a prism 33. The prism 32 has a receiving plane surface 34 for the incident rays of light from without the box 1, said surface being perpendicular to the rays, and a total reflecting surface 35, for directing the rays at right angles to their former direction; while the prism 33 has a receiving plane surface 36, perpendicular to the rays from the standard lamp, a plane annular total reflecting surface 37, and another plane surface 38, perpendicular to the surface 36; while both prisms have plane surfaces at 39, in contact with each other, which are indicated in the face views of the prisms as the circular area 42.

The nature may be understood further, by describing the action. An external light ray 43, passes through the prism 32, is totally reflected at the surface 35, and passes through the surfaces of contact within the circular area 42, to the eye tube 30. A ray 44 from the movable lamp, also passes directly through the contact surfaces within the circle 42, but some other ray, as 45, is totally reflected from the annular surface 41, to the eye tube 30. Thus the observer at the eye tube 30, will see two concentric areas. The lamp holder 5, is therefore moved until the two areas are equally luminous.

The external light might be too bright, or the comparison light might be too bright for securing equal luminosity. There are provided, therefore, absorbing screens 46 and 47, suspended from a rotary arm, 48, radiating from the arbor 49, which has a disk handle 50. When this handle is turned, either of the two screens, which differ in their absorbing power, may be brought either across the rays from the movable lamp or across the external rays from the tube 31. As the screens 46 and 47 are invisible to the operator, there is a scale 51, on the cover 52, which is over the screens 46 and 47, and also there is an index finger 53 extending from the disk 50, for indicating the positions of the hidden screens. To hold the screens in the positions desired, is a pin 54 on the arm 48, pressed by a spring 49ª for pushing the pin into counter-sinks 55.

It is obvious that the measurement may range from 0.004 to 2000. The scale 25 is graduated accordingly.

Without using any screen, the readings of the scale range from .4 to 20. With one of the screens to absorb 90% of the light, the range is extended from 20, to 10 times 20, or 200. Or, as another example, if a certain screen is toward the movable lamp, the scale will be from 0.2 to 0.004, or with the other screen, the range will be 0.04 to 2.

The details of the receiving tube 31 will now be described. It is an elbow, with one arm inserted into a hole in the left hand end of the box 1. At the outer, or external light receiving end, is a diffusing glass 56, which however is removable, being on a cap 57. Evidently, this cap 57 may be removed, and an opaque cap aplied as a cover, when the instrument is shipped. At the turn of the tube 31, is a reversible reflector, 58, one end having a mirror, 59, and the other end carrying a diffusing reflector, 60. Screw threads 61 and 62 permit the reversible reflector to be inserted, either with the mirror or diffusing reflector at half a right angle to the diffusing medium 56, and to the prism 32.

63 is an opaque cap to be screwed upon either the screw 61 or 62.

The elements 56 and 59 are used together; the diffusing reflecting plate 60 is used alone with the medium 56 removed, for candle power measurements.

64 is a diffusing plate at the opening 21 in the partition 2. It is removable.

65 is a rheostat for regulating the current of the movable lamp.

The elbow tube 31, which is rotary, being held by friction, carries a pointer 31$^a$, opposite a scale 31$^b$, on the end of the case 1, as in some instances it is an advantage to measure the angle at which a particular external source of light stands to a vertical line.

The *modus operandi* of this photometer will now be set forth in full.

Assume that it is desired to measure the candle-power of a source of light. The diffusing screen 56 is removed from the tube 31, and the diffusing reflector 60 is turned toward the inside of the receiving tube 31. Then a suitable standard of light is set at a known distance from the diffusing reflector 60, in the prolongation of the axis of the portion of the tube 31, which is at right angles to the photometer box. Having set up this standard of light, and the current being properly adjusted to a known value on the lamp 5$^a$, the distance of the carriage 5 may be adjusted until an equality of illumination exists as observed through the eye-tube 30. When this has been done, the lamp which is to be measured is set up at the same distance from the diffusing reflector 60, as the standard lamp has been; that is, it replaces the standard lamp in the same position. The photometer is again set for equality of illumination in the field, and the new scale reading is taken. The quotient of the scale reading taken with the unknown lamp, divided by the scale reading taken with the standard lamp gives the luminous intensity of the unknown lamp in terms of the standard. For instance, suppose the standard lamp is of 16 c. p., and is set up at such a distance from the photometer that when the photometric balance has been obtained in the photometer, the scale reading is 1.6. Another lamp is then substituted for the standard lamp and the photometric balance gives a scale reading of 3.2. The candle power of the unknown lamp is then $$\frac{3.2}{1.6} \times 16 = 32 \text{ c. p.}$$

It is not necessary that the unknown lamp should be at the same distance from the diffusing reflector 60, providing its distance and the distance of the standard lamp are known, for the distance can be taken account of by the well known inverse square law. It will be noted in the example cited, that except for the position of the decimal point, the photometer is direct reading in candle power. This is a convenient feature of the photometer.

If the instrument is to be used to measure the general illumination in a room, or on the street, as distinct from the illumination given by a single lamp directly, the diffusing glass 56 is put into position on the end of the tube 31, and the mirror side 59 of the reversible reflector is turned toward the inside of the receiving tube 31. Through this mirror, the diffusing plate 56 becomes visible in the photometer eye-piece 30. The procedure then, is properly as follows: The standard lamp, or other standard of light, is set up at such a distance from the plate 56 that the illumination which it produces on the diffusing glass 56 is one unit of illumination, or some multiple or sub-multiple of one. The carriage 5 is then adjusted until the pointer 24 reads one on the scale. Having done this, the current through the lamp 5$^a$ is raised or lowered until, on viewing the photometric arrangement through the tube 30, an equality of illumination is seen to exist. The standard lamp may next be removed, and the instrument used to measure diffused illumination, in which work it is direct reading as long as the above procedure is followed. The instrument may be calibrated before it goes into the hands of the user, so that this direct reading condition will be very nearly fulfilled. If it is found that the illumination on the plate 56 is of so high a value that it is beyond the range of the instrument, that is, greater than that indicated at the top of the scale, one of the two absorbing screens 46—47 is interposed between the photometric prisms and the mirror 59. Thereby the light from the plate 56 is diminished in a known and pre-determined ratio. If, on the other hand, the illumination on the glass 56 is so feeble as to be less than that indicated at the lowest point of the scale, one of the same absorbing screens 46—47 may be turned by the head 50 into a position between the diffusing glass 64 and the photometric prisms. By this means, the light from the comparison lamp 5ª is reduced in a known and pre-determined ratio. In this way, the range obtainable by the use of the instrument may be extended from 0.01 of the lowest value on the scale to 100 times the highest value on the scale, these values being approximate.

We claim as our invention:—

1. In a photometer, the combination of a containing box, two prisms for constituting a photometric device, a plurality of apertured opaque screens for protecting said photometric device from any light reflected from the interior of said box, a scale, a lamp, a translucent window in said box, an openable shutter for said window for permitting, when open, said scale to be illuminated from said lamp, a diffusing test plate, adjustable to different angles, and exposed to all kinds of rays of light to be measured, and an eye tube through which said test plate may be viewed.

2. In a photometer, the combination of a case, a rotary elbow receiving tube thereon, a reversible reflector at the bend of the tube, carrying a mirror on one end, and a diffusion reflector on the other end, and means by which said reflector may be attached to said tube.

3. In a photometer, the combination of a box, a rotary elbow receiving tube thereon, a reversible reflector at the bend of the tube, carrying a mirror on one end, a diffusing reflector on the other end, and means by which said reflector may be attached to said tube; screw threads constituting said means.

4. In a photometer, the combination of an elbow light receiving tube, having a threaded hole at the bend thereof, a threaded tube, for screwing either end of the same into said elbow tube, a mirror mounted upon one end of said tube, and a diffusing reflector mounted upon the other end of said tube.

5. In a photometer, the combination of an elbow light receiving tube, having a threaded hole at the bend thereof, a threaded tube for screwing either end of the same into said elbow tube, a mirror mounted upon one end of said tube, a diffusing reflector mounted upon the other end of said tube, and a removable cap at one end of said elbow tube.

6. In a photometer, the combination of a movable lamp, a prism, a box having openings for external light, and light from said lamp; light absorbing screens, adjustable from the outside of said box, to bring either of said screens to reduce the light from either source, and to remove said screens from the paths of said light, and an indicator for noting the positions of said screens.

7. In a photometer, the combination of a movable lamp, a prism, a box having openings for external light, and light from said lamp, light absorbing screens, adjustable from the outside of said box, to bring either of said screens to reduce the light from either source, and to remove said screens from the paths of said light, and means for adjusting said screens, consisting of a rotary carrier therefor, a handle for the carrier, and a spring catch for retaining the screens in the positions to which they are adjusted.

8. In a photometer, the combination of a box, a movable lamp holder in said box, a plurality of spaced and apertured opaque screens standing across the interior of said box, opposite said holder, with the apertures substantially on the same axial line from said holder, and a flexible connection between said holder and said screens.

9. In a photometer, the combination of a box, a movable lamp holder in said box, a plurality of spaced and apertured opaque screens standing across the interior of said box opposite said holder, with the apertures substantially on the same axial line from said holder; said screens and holder being movable to and from one another, and a flexible connection between said holder and said screens.

10. In a photometer, the combination of a box, a movable lamp holder therein, means on the outside of the box for manually moving said holder, said means consisting of a handle wheel on the outside of the box, a pulley carried by said wheel on the inside of the box, a cord wound around said pulley, and having one end attached to the forward end of said holder, and the other end fastened to the rear end of said holder, other pulleys, said cord passing around said other pulleys for changing the direction of travel of parts of the cord.

11. In a photometer, the combination of a box, a movable lamp holder therein, means on the outside of the box for manually moving said holder, said means consisting of a handle wheel on the outside of the box, a cord wound around said pulley, and having one end attached to the forward end of said holder, and the other end fastened to the rear end of said holder, other pulleys, said cord passing around said other pulleys for changing the direction of travel of parts of the cord, a plurality of movable apertured opaque screens located in the path of, and movable by said holder, guide rods for said screens, easily flexible cords connecting said screens, and sliding rings on said guides and attached to said cords.

12. In a photometer, the combination of a movable lamp holder, movable apertured screens in the path thereof, a box containing said elements, means for moving said holder against the first screen, then said holder and first screen against the second screen, and so on until all the screens have been propelled, and said means being also for moving said holder and screens back again to their first normal positions, a stationary screen 2 having an aperture in line with the apertures in said apertured opaque screens, and a prism on the opposite side of the stationary screen from said opaque screens.

13. In a photometer, the combination of a movable comparison lamp holder, movable apertured opaque screens in front thereof, and cords connecting the above named elements together.

14. In a photometer, the combination of a movable comparison lamp holder, apertured opaque screens in front thereof, and cords connecting the above named elements together, a pointer carried by said holder, a scale along the path of said pointer, and a shutter over the scale, said holder having a window for allowing illumination of the scale at the location of said pointer.

15. In a photometer, the combination of a movable lamp, a scale for indicating illumination, a box, a shutter inside the box for covering said scale, and a disk handle on the outside of said box, for operating said shutter, and said shutter being for permitting the illumination of certain portions of said scale by said movable lamp.

16. In a photometer, the combination of a box, having a longitudinal opening, on the side thereof, a translucent plate with a graduated scale fitted over said opening, a lamp carrier, a pointer attached to said carrier, and located close to said scale, a shutter arranged over the opening, and means for opening and closing said shutter from the outside of the box.

CLAYTON H. SHARP. [L. S.]
PRESTON S. MILLAR. [L. S.]

Witnesses:
F. M. FARMER,
LEONARD J. LEWINSON.